UNITED STATES PATENT OFFICE.

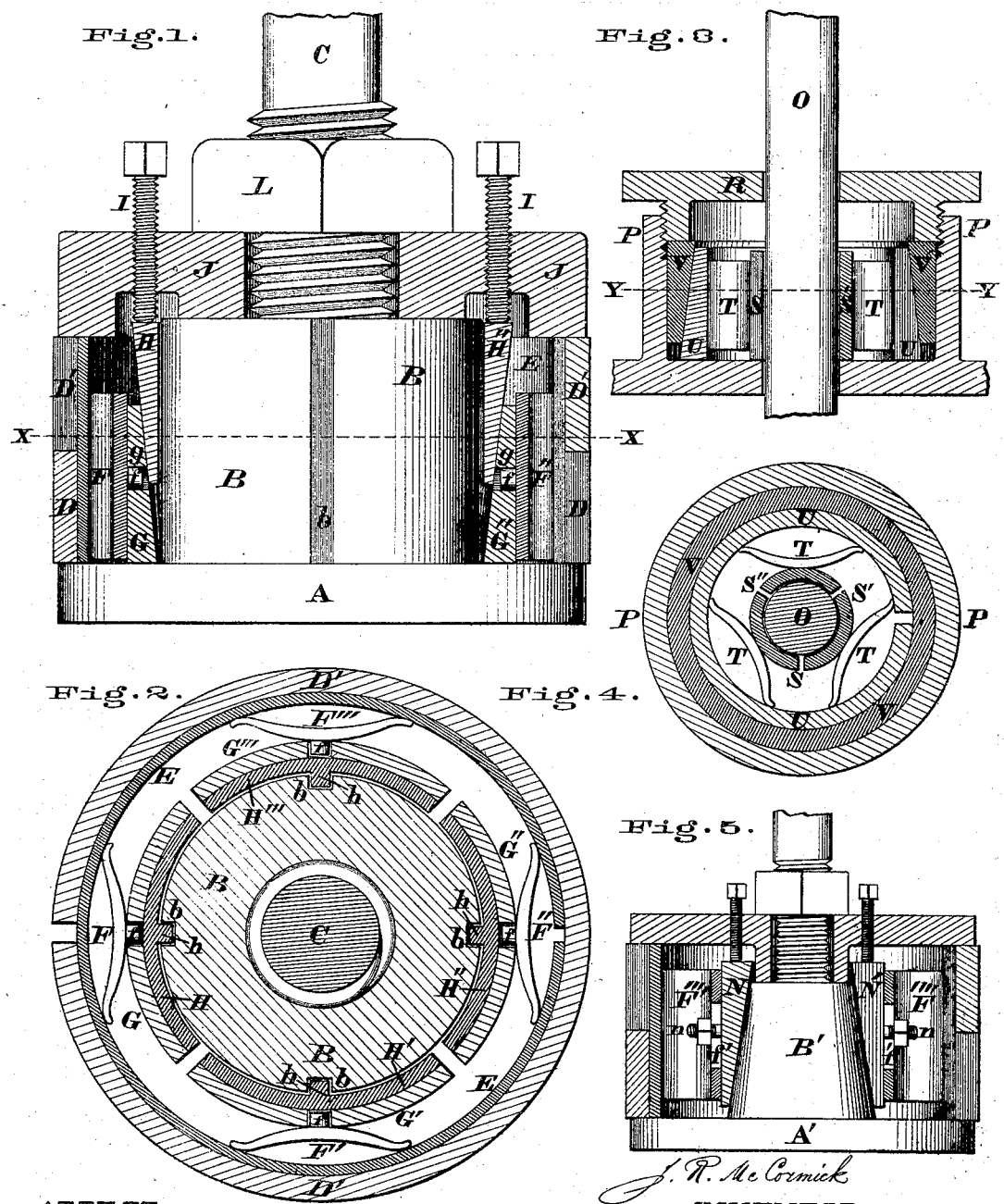

JOHN ROBERT McCORMICK, OF CINCINNATI, OHIO.

IMPROVEMENT IN PISTON-PACKINGS.

Specification forming part of Letters Patent No. 127,625, dated June 4, 1872; antedated May 17, 1872.

I, JOHN R. MCCORMICK, of Cincinnati, Hamilton county, Ohio, have invented certain Improvements in Piston-Packings, of which the following is a specification:

This invention relates to that class of piston or piston-rod packings which consists of a series of metallic rings that are maintained in contact with the interior of the steam-cylinder or with the rod by means of springs; and my improvements consist in a combination hereinafter described, which admits of expanding or contracting the rings without removing the follower or other part of the device, and in such a manner as to cause said packing-rings to bear against the interior of the cylinder with uniformity and with an equal pressure.

A modification of the same invention consists in arranging the aforesaid rings and ring-wedge in such a manner as to serve as a metallic packing in the stuffing-boxes of steam-engines, pumps, &c., the details of construction being hereinafter fully described.

Figure 1 is an axial section of a piston provided with my improved packing; Fig. 2 is a horizontal section of the same at the line X X; Fig. 3 is an axial section of the packing as applied to a stuffing-box; Fig. 4 is a horizontal section of the latter at the line Y Y; and Fig. 5 is a vertical section of a modified form of the packing.

A represents the piston proper, having the customary hub or core B for the reception and attachment of piston-rod C, located a suitable distance from the hub B, and concentric therewith are the usual divided metallic packing-rings D D', having an interior curb or support, E. Situated between this curb and the hub B are springs F F' F'' F''', whose tension, instead of being adjusted by T-bolts, is regulated in the following manner: These springs are provided with lugs $f$ that project toward the center of the piston, and said lugs engage with aperture $g$ of a series of segments, G G' G'' G''', that are considerably thinner at top than at bottom, so as to be wedge-shaped in their vertical section, as seen in Fig. 1. Fitting between the hub B and segments G G' G'' G''' are segmental wedges H H' H'' H''', whose external peripheries incline toward the center of the piston, while their inner peripheries are parallel with the axis of said piston, and are adapted to surround the boss B. Segments H are confined to a proper position by ribs $h$, which enter grooves $b$ in the hub B. These wedge-shaped segments H H' H'' H''' are capable of being adjusted toward the member A of the piston by set-screws I, which engage with the follower J, the latter being secured to the piston-head by nut L.

To adjust the packing-rings D D' so they may bear against the interior of the cylinder with any desired pressure it is only necessary to remove the cylinder-head and operate the set-screws I with a socket-wrench. In case the packing-rings are not tight enough, the screws I should be turned in such a manner as to drive the wedge-shaped segments H toward the flange A, which act forces out the segments G G' G'' G''', thereby compressing the springs F F' F'' F''', expanding the packing-rings D D'', and causing said rings to bear against the interior of the cylinder with an increased pressure. Should the piston fit too tightly in the cylinder the pressure can be diminished by simply unslacking the screws I so as to reduce the tension of springs F F' F'' F'''.

The above-described arrangement of parts will be found preferable whenever there is sufficient space between the hub A and packing D D' to admit the insertion of the springs F F' F'' F''', segments G G' G'' G''', and wedge-shaped segments H; but in case the space is not sufficient to contain all these devices the segments may be omitted, and the springs F F' F'' F''' can be adjusted in the manner shown in Fig. 5. By referring to this illustration it will be seen that the hub B' of the piston A' is conical, and the springs F'''' are united to the segments N N' by studs $n$, which traverse slots $f'$ of said springs.

To adapt this improvement for use as a packing in the stuffing-boxes of steam-engines, pumps, &c., it is to be modified as shown in Figs. 3 and 4. The arrangement of the devices shown in Figs. 3 and 4 will be seen to constitute a modification of the same invention shown in Figs. 1 and 2.

An advantage peculiar to my improvement consists in the fact that piston-heads of the smallest diameter may be provided with metallic packing-rings, which cannot be done with the ordinary arrangement of T-bolts, as in many cases there would not be sufficient space between the hub and the packing-rings to admit such bolts, with their accompanying nuts, for adjusting the pressure of the springs. Another great advantage is that the packing can be adjusted with the utmost nicety in either direction, and without withdrawing the piston or removing the follower or any other member of the piston, the adjustment being effected in a few minutes by the application of a socket-wrench, as previously stated.

After an engine has been in operation for some time, that portion of the cylinder traversed by the piston frequently becomes perceptibly greater in diameter than the extreme ends of the cylinder, and on this account it is a very difficult matter, and in some cases an impossibility, to adjust the packing-rings in a proper manner when T-bolts are employed. If the piston should be entirely withdrawn from the cylinder, and the T-bolts then adjusted so as to cause the packing to exactly fit the end of the cylinder, and the piston again inserted, it would be found too loose to work economically. In case the piston should be again withdrawn, and the rings expanded sufficient to fit the bore, the head would then be too large to enter the end of the cylinder; but by the use of my improvement all these annoyances are dispensed with.

My improvement can be applied to any piston which uses metallic packing.

Claim.

The combination, substantially as herein described, of the piston A B $b$, packing D E, springs F F′ F″ F‴, wedge-shaped segments G G′ G″ G‴ and H H′ H″ H‴ $h$, set-screws I, and follower J, or the described mechanical equivalents thereof, as applied to a stuffing-box, all constructed and arranged substantially as and for the objects stated.

In testimony of which invention I hereunto set my hand.

JOHN ROBERT McCORMICK.

Witnesses:
 GEO. H. KNIGHT,
 JAMES H. LAYMAN.